(12) United States Patent  (10) Patent No.: US 9,136,769 B2
Schroeder gen Berghegger  (45) Date of Patent: Sep. 15, 2015

(54) LOAD CHANGE DETECTION FOR SWITCHED MODE POWER SUPPLY WITH LOW NO LOAD POWER

(71) Applicant: Flextronics AP, LLC, Broomfield, CO (US)

(72) Inventor: Ralf Schroeder gen Berghegger, Glandorf (DE)

(73) Assignee: Flextronics AP, LLC, Broomfield, CO (US)

( * ) Notice: Subject to any disclaimer, the term of this patent is extended or adjusted under 35 U.S.C. 154(b) by 211 days.

(21) Appl. No.: 13/786,032

(22) Filed: Mar. 5, 2013

(65) Prior Publication Data

US 2014/0098576 A1    Apr. 10, 2014

Related U.S. Application Data

(60) Provisional application No. 61/712,183, filed on Oct. 10, 2012.

(51) Int. Cl.
*H02M 3/335* (2006.01)
*H02M 1/00* (2007.01)

(52) U.S. Cl.
CPC .......... *H02M 3/33546* (2013.01); *H02M 3/335* (2013.01); *H02M 3/33523* (2013.01); *H02M 3/33553* (2013.01); *H02M 2001/0003* (2013.01);
(Continued)

(58) Field of Classification Search
CPC .................................................. H02M 3/33546
USPC .......... 363/21.01, 21.02, 21.04, 21.03, 21.16, 363/16
See application file for complete search history.

(56) References Cited

U.S. PATENT DOCUMENTS

| 4,273,406 A | 6/1981 | Okagami |
| 4,370,703 A | 1/1983 | Risberg |
| 4,563,731 A | 1/1986 | Sato et al. |

(Continued)

FOREIGN PATENT DOCUMENTS

| JP | 4217869 A | 8/1992 |
| JP | 10243640 A | 9/1998 |

(Continued)

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Matthew Nguyen
*Assistant Examiner* — Trinh Dang
(74) *Attorney, Agent, or Firm* — Haverstock & Owens LLP

(57) ABSTRACT

A pulse scheme is used for load change detection in a switching mode power supply with low no-load power consumption. The pulse scheme includes a measurement pulse for determining a load condition or a no-load condition at the output. Generation of the measurement pulse results in sufficient energy transfer to the secondary side to accurately measure the output voltage via a reflected voltage on the primary side. Once in no-load operation mode, a reference pulse having a lower energy transfer than the measurement pulse is used to determine a baseline reflected voltage value that corresponds to a no-load condition. Successive detection pulses are then generated and corresponding reflected voltage measured and compared to the baseline reflected voltage. A change in the reflected value that exceeds a threshold value is indicative of a change in the no-load condition.

24 Claims, 9 Drawing Sheets

(52) U.S. Cl.
CPC ........ *H02M 2001/0032* (2013.01); *Y02B 70/16* (2013.01)

(56) References Cited

U.S. PATENT DOCUMENTS

| | | |
|---|---|---|
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway, Tin |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,365,403 A | 11/1994 | Vinciarelli et al. |
| 5,373,432 A | 12/1994 | Vollin |
| 5,442,540 A | 8/1995 | Hua |
| 5,673,185 A | 9/1997 | Albach et al. |
| 5,712,772 A | 1/1998 | Telefus et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,841,641 A | 11/1998 | Faulk |
| 5,859,771 A | 1/1999 | Kniegl |
| 5,905,369 A | 5/1999 | Ishii et al. |
| 5,923,543 A | 7/1999 | Choi |
| 5,949,672 A | 9/1999 | Bertnet |
| 5,978,238 A | 11/1999 | Liu |
| 5,982,153 A | 11/1999 | Nagai et al. |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 6,990,000 B1 | 1/2006 | Rodriquez et al. |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,564,706 B1 | 7/2009 | Herbert |
| 7,596,007 B2 | 9/2009 | Phadke |
| 7,701,305 B2 | 4/2010 | Lin et al. |
| 7,830,684 B2 | 11/2010 | Taylor |
| 7,924,578 B2 | 4/2011 | Jansen et al. |
| 8,059,434 B2 | 11/2011 | Huang et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,207,717 B2 | 6/2012 | Urono et al. |
| 8,243,472 B2 | 8/2012 | Chang et al. |
| 8,344,689 B2 | 1/2013 | Boguslavkij |
| 8,369,111 B2 | 2/2013 | Balakrishnan et al. |
| 8,400,801 B2 | 3/2013 | Shinoda |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0183510 A1 | 9/2004 | Sutardja et al. |
| 2004/0255259 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0290384 A1 | 11/2009 | Jungreis |
| 2010/0039833 A1 | 2/2010 | Coulson et al. |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2011/0096573 A1 | 4/2011 | Zhu et al. |
| 2011/0109248 A1 | 5/2011 | Zhu et al. |
| 2011/0132899 A1 | 6/2011 | Shimomugi et al. |
| 2011/0157924 A1 | 6/2011 | Huynh |
| 2011/0157936 A1* | 6/2011 | Huynh ........................... 363/78 |
| 2011/0255311 A1 | 10/2011 | Hsu et al. |
| 2011/0261590 A1 | 10/2011 | Liu |
| 2012/0112657 A1 | 5/2012 | Van Der Veen et al. |
| 2012/0153866 A1 | 6/2012 | Liu |

FOREIGN PATENT DOCUMENTS

| | | |
|---|---|---|
| JP | 2000083374 A | 3/2000 |
| JP | 20000253648 A | 9/2000 |
| JP | 2004208357 A | 7/2004 |

OTHER PUBLICATIONS

EE Times. com—"Wireless Beacon Could Recharge Consumer Devices", by R. Colin Johnson, 3 pages, Nov. 6, 2007.
Novel Zero-Voltage and Zero-Current Switching (ZVZCS) Full Bridge PWM converter Using Coupled Output Inductor, Sep. 2002 IEEE, pp. 641-648.
"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

(56) References Cited

OTHER PUBLICATIONS

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Respones", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

* cited by examiner

LOAD CHANGE DETECTION FOR SWITCHED MODE POWER SUPPLY WITH LOW NO LOAD POWER

RELATED APPLICATIONS

This Patent Application claims priority under 35 U.S.C. 119(e) of the U.S. provisional application Ser. No. 61/712,183, filed Oct. 10, 2012, and entitled "Intermediate Valley Switching Mode Converter", by this same inventor. This application incorporates U.S. provisional application Ser. No. 61/712,183 in its entirety by reference.

FIELD OF THE INVENTION

The present invention is generally directed to the field of power converters. More specifically, the present invention is directed to a power converter architecture configured to minimize the no-load power of a switch mode power supply.

BACKGROUND OF THE INVENTION

A power supply or power converter converts one form and voltage of electrical power to another desired form and voltage. AC-to-DC power supplies convert alternating current voltage, for example 115 or 230 volt alternating current (AC) supplied by a utility company, to a regulated direct current (DC) voltage. DC-to-DC power supplies convert DC voltage at one level, for example 400V, to another DC voltage, for example 12V.

A switched-mode power supply, switching-mode power supply or SMPS, is a power supply that incorporates a switching regulator. An SMPS actively switches a transistor between full saturation and full cutoff at a high rate. The resulting rectangular waveform is then passed through a low-pass filter, typically an inductor and capacitor (LC) circuit, to achieve an approximated output voltage.

A SMPS uses a high frequency switch, a transistor, with varying duty cycle to maintain the output voltage. The output voltage variations caused by the switching are filtered out by the LC filter. SMPSs can be used to step-down a supply voltage as well as provide a step-up function and an inverted output function. An SMPS converts an input voltage level to another level by storing the input energy temporarily and then releasing the energy to the output at a different voltage. The storage may be in either electromagnetic components, such as inductors and/or transformers, or electrostatic components, such as capacitors. A load is coupled to the output to utilize the delivered energy. When no load is coupled to the output of the power converter, a no load power condition exists. No load power consumption is the energy consumed by the power converter when the power converter is coupled to an input power supply but no load is connected, such as when a power charger is plugged into a wall socket but without a mobile phone or other handheld device being connected.

With the introduction of high speed composite semiconductor switches, such as metal oxide semiconductor field effect transistor (MOSFET) switches operated by pulse width modulation (PWM), recent SMPS topologies are now capable of operation at greatly increased switching frequencies, such as, for example, up to 1.0 MHz. However, to minimize the no load power of a SMPS it is necessary to minimize the switching frequency and the amount of power that is transferred to the secondary side per pulse.

The power that is transferred to the secondary side is $P=W_p*f_s$, where $W_p$ is the energy transferred with each pulse and $f_s$ is the switching frequency of the main switch. To minimize the no load power the transferred power P must be as small as possible because it must be consumed by a base load. Otherwise the output voltage rises if no load is connected. The pulse must have a minimum pulse width to ensure that some energy is transferred to the secondary side. To minimize the transferred power P it is necessary to decrease the energy $W_p$ that is transferred with each pulse and the switching frequency $f_s$.

Modern SMPS controllers control the output voltage and current by measuring the reflected voltage at a winding of the transformer. If the transferred energy per pulse is very low, then it is very difficult to detect the output voltage because the reflected pulse is influenced by parasitic effects. If the frequency is very low, then a change of the output voltage can only be detected with a big delay. Therefore fast response to a load change is not possible.

SUMMARY OF THE INVENTION

Embodiments are directed to a power converter circuit and method for minimizing the no-load power consumed by the power converter. The power converter circuit includes a transformer and a main switch coupled to the primary winding. The main switch is turned ON and OFF by a controlled driving circuit. While the main switch is turned ON, a primary current through the primary winding is enabled.

A measurement pulse is used to determine the exact output voltage value, and the determined output voltage value is used to determine a load or no-load condition. When no load is detected a very small reference pulse is generated a short time after the preceding measurement pulse. The peak voltage of the reference pulse is measured and the result is stored. Alternatively, a sampled voltage at a certain portion of the reference pulse or the average of the reference pulse voltage for a certain time can be used instead of the peak voltage of the reference pulse. In some embodiments, the measured peak voltage is stored as a digital value after an analog-to-digital conversion. After the reference pulse is measured, detection pulses of the same "size" as the reference pulse, for example the same amount of transferred energy and/or the same primary peak current, are generated with a frequency that is small enough to keep the input power low, but high enough to enable sufficient load response time. In some cases, the reference pulse and the detection pulses may be so small that detection of the exact output voltage is very difficult or impossible. Nevertheless, the measured peak voltage can be used to detect a voltage change at the output. Since the reference pulse and the detection pulses transfer the same amount of energy, the measured peak voltage is the same unless there is a change of the output voltage. The controller detects a voltage drop and increase energy transfer to the secondary side by comparing the stored result with the result of the peak voltage after each detection pulse. In some embodiments, measurement pulses are implemented at very low frequency to recheck the output voltage. The measurement pulses should be as small as possible, but big enough to detect the exact output voltage. After each measurement pulse, a new reference pulse and several (one or more) detection pulses are implemented if a no-load condition is determined.

In an aspect, a method of controlling a switching mode power converter is disclosed. The method includes configuring a switching mode power converter including a transformer having a primary winding coupled to an input supply voltage and a secondary winding coupled to an output, a switch coupled in series to the primary winding, and a controller coupled to the switch. The method also includes generating one or more measurement pulses by selectively turning ON and OFF the switch and measuring a reflected voltage corresponding to each measurement pulse until a no-load condition at the output is determined, wherein the measured reflected voltage is proportional to an output voltage of the switching mode power converter. The method also includes after the no-load condition is determined, generating a reference pulse by selectively turning ON and OFF the switch and measuring the reflected voltage corresponding to the reference pulse, wherein the measured reflected voltage corresponding to the reference pulse comprises a baseline reflected voltage. The method also includes generating one or more detection pulses by selectively turning ON and OFF the switch and measuring the reflected voltage corresponding to each detection pulse. The method also includes comparing the reflected voltage corresponding to each detection pulse to the baseline reflected voltage until a difference between the two exceeds a threshold value whereupon a change in the no-load condition is determined.

Generating each measurement pulse can result in sufficient energy transfer to a secondary side of the switching mode power converter so as to accurately determine the output voltage according to the measured reflected voltage. Generating the reference pulse can result in energy transfer to the secondary side of the switching mode power converter, wherein the energy transfer corresponding to the reference pulse is less than the energy transfer corresponding to the measurement pulse. The energy transfer corresponding to the reference pulse can be insufficient to accurately determine the output voltage according to the measured reflected voltage. There can be an off time between generating the reflected pulse and generating a first detection pulse during which the reflected voltage settles to almost zero. There can be an off time between generating successive detection pulses during which the reflected voltage settles to almost zero. When the no-load condition is determined, the switching mode power converter can be set to a no-load mode of operation. When the change in the no-load condition is determined, the switching mode power converter can be set to a normal load mode of operation. When the change in the no-load condition is determined, the method can also include generating another measurement pulse, measuring the reflected voltage corresponding to the other measurement pulse and determining if there is a load condition or the no-load condition at the output according to the measured reflected voltage corresponding to the other measurement pulse. The reflected voltage can be a voltage across the primary winding. The switching mode power converter can also include an auxiliary winding electrically coupled to the controller and magnetically coupled to the secondary winding, wherein the reflected voltage comprises a voltage across the auxiliary winding.

In another aspect, another method of controlling a switching mode power converter is disclosed. The method includes configuring a switching mode power converter comprising a transformer having a primary winding coupled to an input supply voltage and a secondary winding coupled to an output, a switch coupled in series to the primary winding, and a controller coupled to the switch. The method also includes generating a measurement pulse by selectively turning ON and OFF the switch and measuring a reflected voltage corresponding to the measurement pulse, wherein the measured reflected voltage corresponding to the measurement pulse is proportional to an output voltage of the switching mode power converter. The method also includes determining a load condition or a no-load condition at the output according to the measured reflected voltage corresponding to the measurement pulse. If the load condition is determined, then periodically generating additional measurement pulses until the no-load condition is determined. If the no-load condition is determined, then generating a reference pulse by selectively turning ON and OFF the switch and measuring the reflected voltage corresponding to the reference pulse, wherein the measured reflected voltage corresponding to the reference pulse comprises a baseline reflected voltage; generating a detection pulse by selectively turning ON and OFF the switch and measuring the reflected voltage corresponding to the detection pulse; and comparing the reflected voltage corresponding to the detection pulse to the baseline reflected voltage, and if a difference between the reflected voltage corresponding to the detection pulse and the baseline reflected voltage is less than a threshold value, then it is determined that the no-load condition remains and a subsequent detection pulse is generated and compared, and if the difference is greater than or equal to the threshold value, then it is determined that there is a change in the no-load condition.

Generating the measurement pulse can result in sufficient energy transfer to a secondary side of the switching mode power converter so as to accurately determine the output voltage according to the measured reflected voltage. Generating the reference pulse can result in energy transfer to the secondary side of the switching mode power converter, wherein the energy transfer corresponding to the reference pulse is less than the energy transfer corresponding to the measurement pulse. The energy transfer corresponding to the reference pulse can be insufficient to accurately determine the output voltage according to the measured reflected voltage. There can be an off time between generating the reflected pulse and generating the detection pulse during which the reflected voltage settles to almost zero. There can be an off time between generating successive detection pulses during which the reflected voltage settles to almost zero. If the no-load condition is determined, the switching mode power converter can be set to a no-load mode of operation. If the load condition is determined, then the switching mode power converter can be set to a normal load mode of operation. If the change in the no-load condition is determined, then the switching mode power converter can be set to a normal load mode of operation. If the change in the no-load condition is determined, then the method can also include generating another measurement pulse, measuring the reflected voltage corresponding to the other measurement pulse and determining if there is the load condition or the no-load condition at the output according to the measured reflected voltage corresponding to the other measurement pulse. The reflected voltage can be a voltage across the primary winding. The switching mode power converter can also include an auxiliary winding electrically coupled to the controller and magnetically coupled to the secondary winding, wherein the reflected voltage comprises a voltage across the auxiliary winding.

In another aspect, a switching mode power converter is disclosed. The switching mode power converter includes a transformer, a switch and a controller. The transformer has a primary winding coupled to an input supply voltage and a secondary winding coupled to an output. The switch is coupled in series to the primary winding. The controller is coupled to the switch, wherein the controller is configured to turn the switch ON and OFF. The controller is also configured to generate one or more measurement pulses by selectively turning ON and OFF the switch and measuring a reflected voltage corresponding to each measurement pulse until a no-load condition at the output is determined, wherein the measured reflected voltage is proportional to an output voltage of the switching mode power converter, and after the no-load condition is determined, generate a reference pulse by selectively turning ON and OFF the switch and measuring the reflected voltage corresponding to the reference pulse, wherein the measured reflected voltage corresponding to the reference pulse comprises a baseline reflected voltage, and generate one or more detection pulses by selectively turning ON and OFF the switch and measuring the reflected voltage corresponding to each detection pulse, and compare the reflected voltage corresponding to each detection pulse to the baseline reflected voltage until a difference between the two exceeds a threshold value whereupon a change in the no-load condition is determined.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
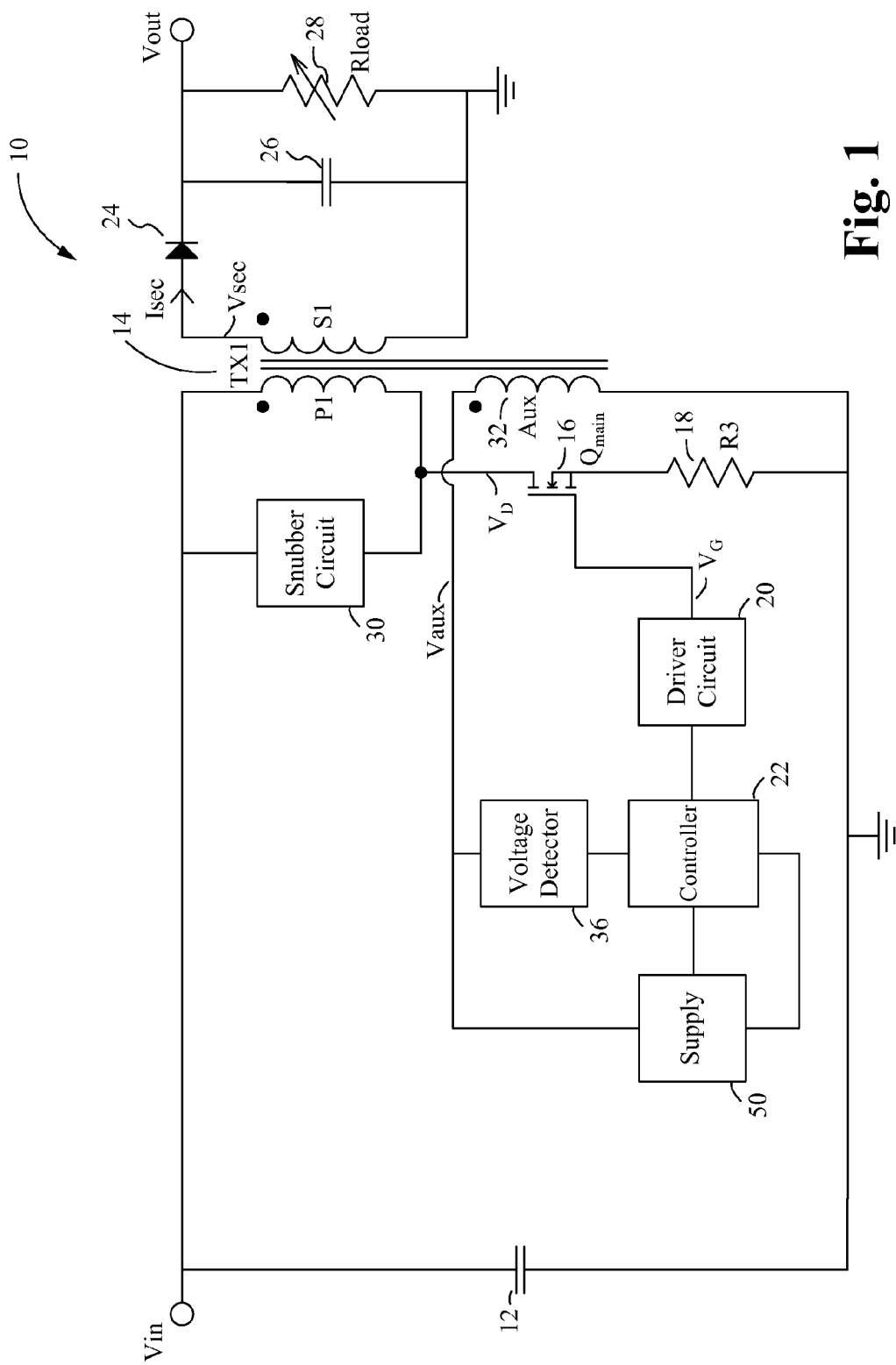
FIG. 1 illustrates a power converter circuit according to an embodiment.

FIG. 1 illustrates a power converter circuit according to an embodiment. The power converter 10 is configured to receive an unregulated DC voltage signal as input voltage Vin and to provide a regulated output voltage Vout. Input voltage to the circuit may be unregulated DC voltage derived from an AC supply after rectification. The input voltage is typically filtered, such as via capacitor 12. In some embodiments, the output voltage level is suitable for many low voltage appliances such as computer laptops, cell phones and other hand held devices. In an exemplary embodiment the output voltage Vout is set at 10V or less. Alternatively, the power converter 10 can provide the output voltage Vout that is greater than 10 VDC.

The power converter 10 is configured as a step down converter. In some embodiments, the power converter is configured to include attributes from a flyback type converter. In general, the power converter can include configurations of switch mode power supplies known to a person of skill in the art. The power converter 10 includes an isolation transformer 14 having a primary winding P1 and a secondary winding S1, a main switch 16, a resistor 18, a driver circuit 20, a controller 22 and a sensing circuit. The primary winding P1 is coupled to the input voltage Vin, the main switch 16 and a snubber circuit 30. The snubber circuit 30 is configured to prevent high peak voltages at the main switch 16 and reduces electromagnetic interference (EMI). The resistor 18 is a shunt resistor and functions to set a peak primary current through the primary winding P1. The main switch 16 is a suitable switching device. In an exemplary embodiment, the switch 16 is a n-type metal-oxide-semiconductor field-effect transistor (MOSFET) device. Alternatively, any other semiconductor switching device known to a person of skill in the art can be substituted for the switch 16. The transistor 16 is controlled by the controller 22 to maintain a desired output voltage Vout. The controller 22 controls the transistor 16 with the driver circuit 20. In some embodiments, the driver circuit 20 is a pulse width modulation (PWM) circuit. The controller 22 regulates the duty cycle of the transistor 16 with the PWM circuit.

An output circuit is coupled to the secondary winding S1. The output circuit includes a diode 24 and a capacitor 26. The secondary winding voltage is rectified and filtered using the diode 24 and the capacitor 26, with the output voltage Vout delivered to a load 28.

In some embodiments, the sensing circuit includes an auxiliary winding 32 that is another winding on the primary side of the transformer 14. The auxiliary winding 32 is magnetically coupled to the secondary winding S1 and electrically isolated from the primary winding P1. The sensing circuit also includes a voltage detector circuit 36 and a power supply circuit 50. The voltage detector 36 measures a voltage Vaux across the auxiliary winding 32 and transmits the measured auxiliary winding voltage Vaux to the controller 22.

Figure 2:
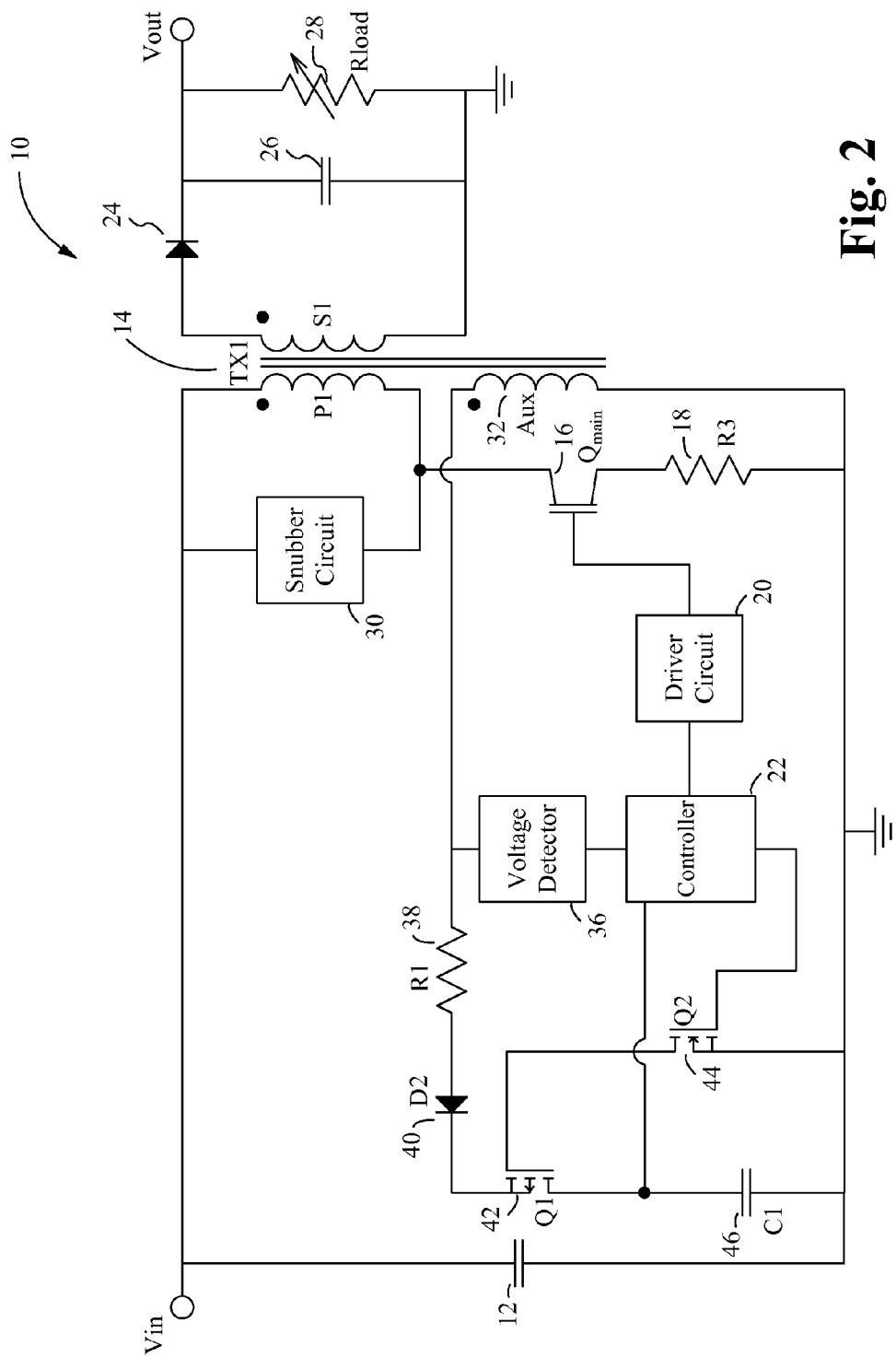
FIG. 2 illustrates the power converter of FIG. 1 with an exemplary configuration of the power supply circuit 50 according to an embodiment.

The power supply circuit 50 is configured to supply power to the controller 22. In some embodiments, the power supply circuit 50 includes a pair of transistors and a capacitor, the transistors under control of the controller 22 for enabling current flow from the auxiliary winding 32 to the capacitor for storing energy used to power the controller 22. FIG. 2 illustrates the power converter 10 of FIG. 1 with an exemplary configuration of the power supply circuit 50 according to an embodiment. In the exemplary configuration of FIG. 2, the power supply circuit 50 includes a resistor 38, a diode 40, a transistor 42, a transistor 44 and a capacitor 46. The resistor 38 and the diode 40 are coupled in series to the auxiliary winding 32 and function to provide supply current from the auxiliary winding 32 to the sensing circuit and the controller 22. The capacitor 46 stores energy while the supply current is provided via the diode 40 and the resistor 38 and powers the controller 22 between pulses. The transistors 42 and 44 enable switching ON and OFF the supply current through the diode 40 and the resistor 38. The transistors 42 and 44 are controlled by the controller 22. The power supply circuit 50 can also function without transistors 42 and 44, but then the minimum pulse must be somewhat bigger because some energy is transferred to the controller 22. With the inclusion of transistors 42 and 44, the controller 22 can control when current flows to the supply, which is the capacitor 46. In some embodiments, the transistors 42 and 44 are switched OFF during sampling of the output voltage because then sampling of the output voltage is more precise. In some cases, the transistors 42 and 44 may be switched ON during sampling to ensure that the controller 22 gets enough supply power. This should be done with bigger pulses at low frequency.

In operation, the transformer 14 and the parasitic capacitances of the transformer 14 and the main switch 16 form a resonant circuit. It is understood that the resonant circuit can include other components including, but not limited to, secondary diode capacitance, snuber circuit, if present, and capacitance and inductance of tracks on the printed circuit board. To transfer energy to the secondary side of the power converter circuit, the voltage amplitude of the first wave of the oscillation at the secondary winding S1 must reach the output voltage Vout plus the voltage drop across the diode 24. If the energy transferred across the transformer 14 is too low, then the energy will be consumed by the parasitics. In this case, the voltage across the secondary winding S1 stays below the critical value of the output voltage Vout plus the voltage drop across the diode 24 and there is no secondary current through the diode 24. With no secondary current, the voltage across the secondary winding S1, and therefore the voltage across the primary winding P1, is independent of the output voltage Vout and the output voltage Vout can not be detected. The value of the output voltage Vout is used by the controller 22 to perform one or more control functions.

Figure 3A:
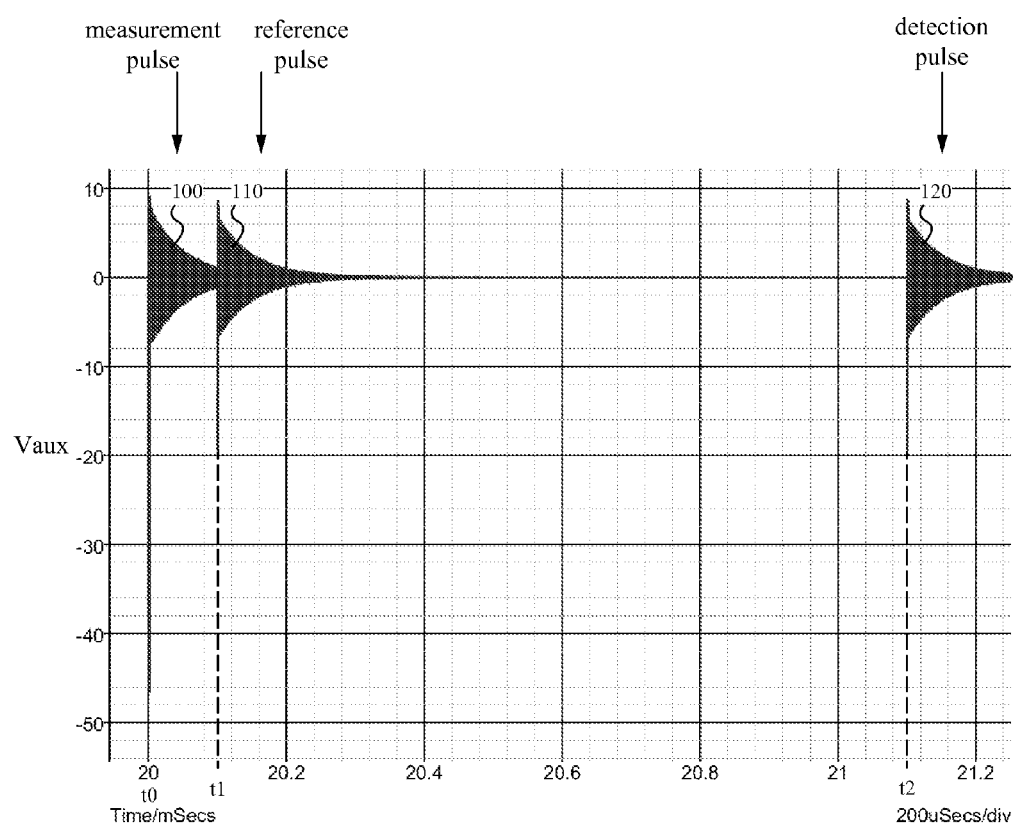
FIG. 3A illustrates an exemplary measurement pulse, reference pulse and detection pulse relevant to no-load operation of the power converter circuit of FIG. 1 according to an embodiment.

A pulse scheme is implemented for minimizing the no-load power consumed by the power converter. The controller 22 selectively drives the driving circuit 20 to generate a series of control pulses for turning the main switch 16 ON and OFF. The control pulses result in corresponding reflected voltage pulses, which are pulses of the auxiliary voltage Vaux measured by the voltage detector 36. The pulse scheme results in three different types of reflected voltage pulses relevant for no-load operation. The three pulse types for no-load operation are referred to as a measurement pulse, a reference pulse and a detection pulse FIG. 3A illustrates an exemplary measurement pulse, reference pulse and detection pulse relevant to no-load operation of the power converter circuit of FIG. 1 according to an embodiment. The waveform shown in FIG. 3A shows the measured auxiliary voltage Vaux versus time. The exemplary waveform includes a measurement pulse 100, a reference pulse 110 and a detection pulse 120. Each pulse is initiated by briefly turning ON the main switch 16, as described in greater detail below. As shown in FIG. 3A, at approximately 20.0 msec the measurement pulse 100 is initiated. The measurement pulse 100 is used by the controller 22 to measure the output voltage Vout via the auxiliary winding 32, where the output voltage Vout is proportional to the auxiliary voltage Vaux. The measured auxiliary voltage Vaux is used to determine if a no-load condition exists. In this example, the measurement pulse 100 indicates a no-load condition because the auxiliary voltage Vaux is high although the output power has been low before the measurement pulse. In general, any conventional method for detecting when a no load condition occurs can be used. The method depends on the control loop at normal load condition. Examples of detecting a no-load condition include, but are not limited to, when the output voltage exceeds a certain voltage, when the controller is at minimum normal load duty cycle and the output voltage is rising, if the controller is at minimum normal load duty cycle and the output voltage exceeds a certain level, or when a voltage/current in the control loop reaches a level that indicates that the controller has reached minimum output power, but is still required to decrease the output power. Since a no-load condition has been determined, an off-time is generated that is long enough to let the oscillation of the auxiliary voltage Vaux settle to a value that is low enough to make its influence on the next pulse negligible, such as at time t1 corresponding to approximately 20.1 msec. The off-time is an amount of time that the main switch 16 remains OFF. The auxiliary voltage Vaux oscillates due to the resonant circuit formed by the main switch 16 and the transformer 14.

At time t1, the reference pulse 110 is then generated by briefly turning ON the main switch 16. Once the main switch 16 is turned OFF, the auxiliary voltage Vaux is measured to determine the peak voltage of the reference pulse 110. After the reference pulse 110 is initiated and the main switch 16 is turned OFF, another off-time is maintained until time t2 corresponding to approximately 21.1 msec. The length of the off-time is determined by the required load response time. It can be set by the designer. If a fast response to load change is required then the off-time must be short, but no load power is higher than when a slower load response can be allowed which enables longer off-time.

At time t2, the detection pulse is then generated by briefly turning ON the main switch 16. Preferably, the energy that is transferred to the secondary side resulting from the initiation of the detection pulse is the same, or almost the same, as the energy that is transferred by the initiation of the reference pulse. Initiation of the reference pulse and the detection pulse is accomplished by turning ON the main switch 16. The amount of energy transferred by the initiation of the reference pulse is a function of the on-time of the main switch 16 during initiation of the reference pulse. Similarly, the amount of energy transferred by the initiation of the detection pulse is a function of the on-time of the main switch 16 during initiation of the detection pulse. Since the energy transfer corresponding to the reference pulse is the same, or almost the same, as the energy transfer corresponding to the detection pulse, the peak voltage of the measured auxiliary voltage Vaux after the detection pulse is the same, or almost the same, as the peak voltage after the reference pulse if the output voltage is unchanged. An unchanged output voltage indicates that the no-load condition is maintained. In the case of a voltage drop, for example due to a load change, the peak voltage after a detection pulse becomes lower than the peak voltage after the reference pulse. Accordingly, the controller 22 can use the peak voltage of the measured auxiliary voltage Vaux to detect if the output voltage has dropped, and therefore determine if the load condition has changed.

Figure 3B:
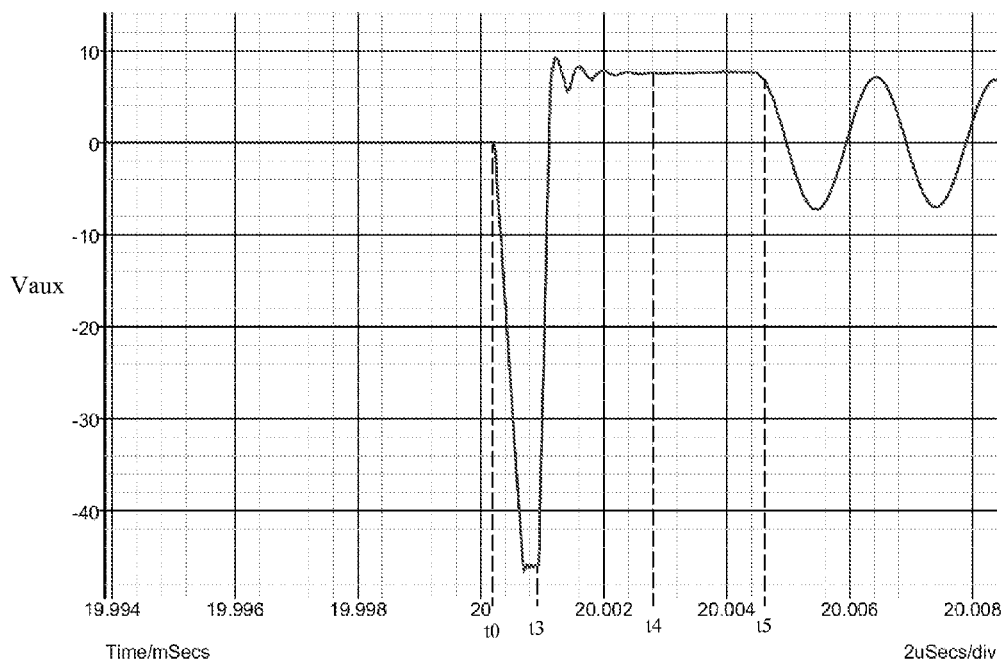
FIG. 3B illustrates the measurement pulse of FIG. 3A in more detail according to an embodiment.

FIG. 3B illustrates the measurement pulse 100 of FIG. 3A in more detail according to an embodiment. The measurement pulse is initiated by turning the main switch 16 ON at time t0 corresponding to approximately time 20.0002 msec. The main switch 16 remains ON long enough to ensure that enough energy is transferred to the secondary side to measure the output voltage Vout via the auxiliary voltage Vaux at the auxiliary winding 32. In the exemplary case shown in FIG.

3B, the main switch 16 is ON from time t0 to time t3, where time t3 corresponds to approximately time 20.001 msec. When the main switch 16 is OFF, starting from time 20.001 ms (time t3), the voltage at the secondary winding, which is proportional to the auxiliary voltage Vaux shown in FIG. 3B, rises high enough to enable sufficient current flow through the secondary winding into the output for the minimum energy transfer to the secondary side needed to measure the output voltage Vout. This energy transfer time period occurs from time t3 corresponding to approximately 20.0015 msec to time t5 corresponding to time 20.0046 msec. Within the time period from time t3 to time t5, there is first some voltage overshoot and oscillation at the auxiliary winding due to leakage inductance. This overshoot and oscillation period extends from time t3 to time t4, where time t4 corresponds to approximately 20.0028 msec. After time t4 to time t5, the auxiliary voltage Vaux is proportional to the output voltage Vout. In some embodiments, the auxiliary voltage Vaux is equal to, or almost equal to, the sum of the output voltage Vout plus the forward voltage of the secondary diode multiplied by the turns ratio of the auxiliary winding to the secondary winding. Accordingly, between approximately 20.0028 (time t4) and time 20.0046 msec (time t5), the controller 22 can determine the output voltage by the measured auxiliary voltage Vaux.

Figure 3C:
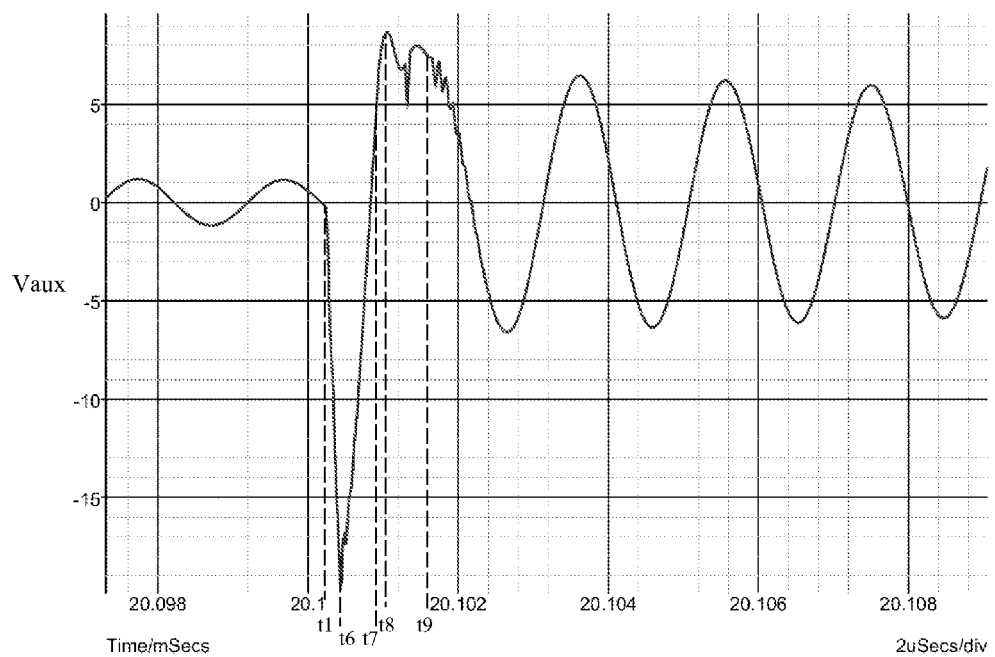
FIG. 3C illustrates the reference pulse of FIG. 3A in more detail according to an embodiment.

FIG. 3C illustrates the reference pulse 110 of FIG. 3A in more detail according to an embodiment. The reference pulse is initiated by turning the main switch 16 ON at time t1 corresponding to approximately time 20.1003 msec. The main switch 16 remains ON long enough to transfer a very small amount of energy to the secondary side. There must be some energy transfer to the secondary side which is bigger than zero. The transferred energy should be as small as possible to keep no-load power as small as possible. In the exemplary case shown in FIG. 3C, the main switch 16 is ON from time t1 to time t6, where time t6 corresponds to approximately time 20.1004 msec. The on-time for generating the reference pulse 110 is less than the on-time for generating the measurement pulse 100, and therefore less energy is transferred to the secondary side related to the reference pulse 110 than to the measurement pulse 100. When the main switch 16 is OFF, starting from time 20.1004 ms (time t6), the voltage at the secondary winding, which is proportional to the auxiliary voltage Vaux shown in FIG. 3C, rises high enough to enable current flow through the secondary winding into the output. Current flow is enabled at time t7, which corresponds to approximately time 20.1009 msec, to time t9, which corresponds to approximately time 20.1016 msec. There is no point where the auxiliary voltage Vaux is indicative of the output voltage Vout. However, there is an influence on the output voltage Vout while current flows through the secondary winding into the output, and as such there is also an influence on the auxiliary voltage Vaux while the current flows through the secondary winding. Therefore the peak auxiliary voltage Vaux, at time t8, varies if the output voltage varies.

Figure 3D:
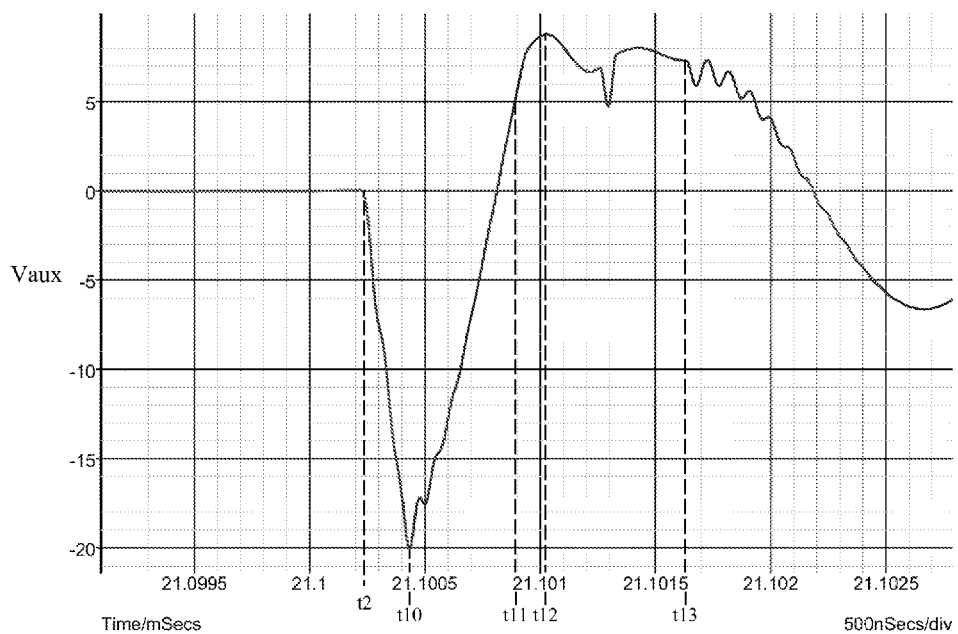
FIG. 3D illustrates the detection pulse of FIG. 3A in more detail according to an embodiment.

FIG. 3D illustrates the detection pulse 120 of FIG. 3A in more detail according to an embodiment. The detection pulse is initiated by turning the main switch 16 ON at time t2 corresponding to approximately time 21.10025 msec. The main switch 16 remains ON long enough to transfer a very small amount of energy to the secondary side. There must be some energy transfer to the secondary side which is bigger than zero. The transferred energy should be as small as possible to keep no-load power as small as possible. In the exemplary case shown in FIG. 3D, the main switch 16 is ON from time t2 to time t10. When the main switch 16 is OFF, starting from time t10, the voltage at the secondary winding, which is proportional to the auxiliary voltage Vaux shown in FIG. 3D, rises high enough to enable current flow through the secondary winding into the output. Current flow is enabled at time t11, which corresponds to approximately time 21.10009 msec, to time t13, which corresponds to approximately time 21.10165 msec. As with the reference pulse, there is no point in the detection pulse where the auxiliary voltage Vaux is indicative of the output voltage Vout. However, there is an influence on the output voltage Vout while current flows through the secondary winding into the output, and as such there is also an influence on the auxiliary voltage Vaux while the current flows through the secondary winding. Therefore the peak auxiliary voltage Vaux, at time t12, varies if the output voltage varies.

The controller 22 compares the peak voltage measured for the detection pulse to the peak voltage measured for the reference pulse. If the peak voltages are the same, then it is determined that the no-load condition at the output remains. If instead, it is determined that the peak voltages are different, then it is determined that the no-load condition at the output has changed. In the exemplary waveform shown in FIGS. 3A, 3B and 3C, there is no change in the no-load condition at the output, and therefore the output voltage Vout remains unchanged. Therefore, the detection pulse 120 has the same waveform and the same peak voltage as the reference pulse 110. Using this methodology, it can determine if the output voltage Vout is unchanged by measuring and comparing the peak voltage of the reference pulse and the detection pulse.

Figure 3E:
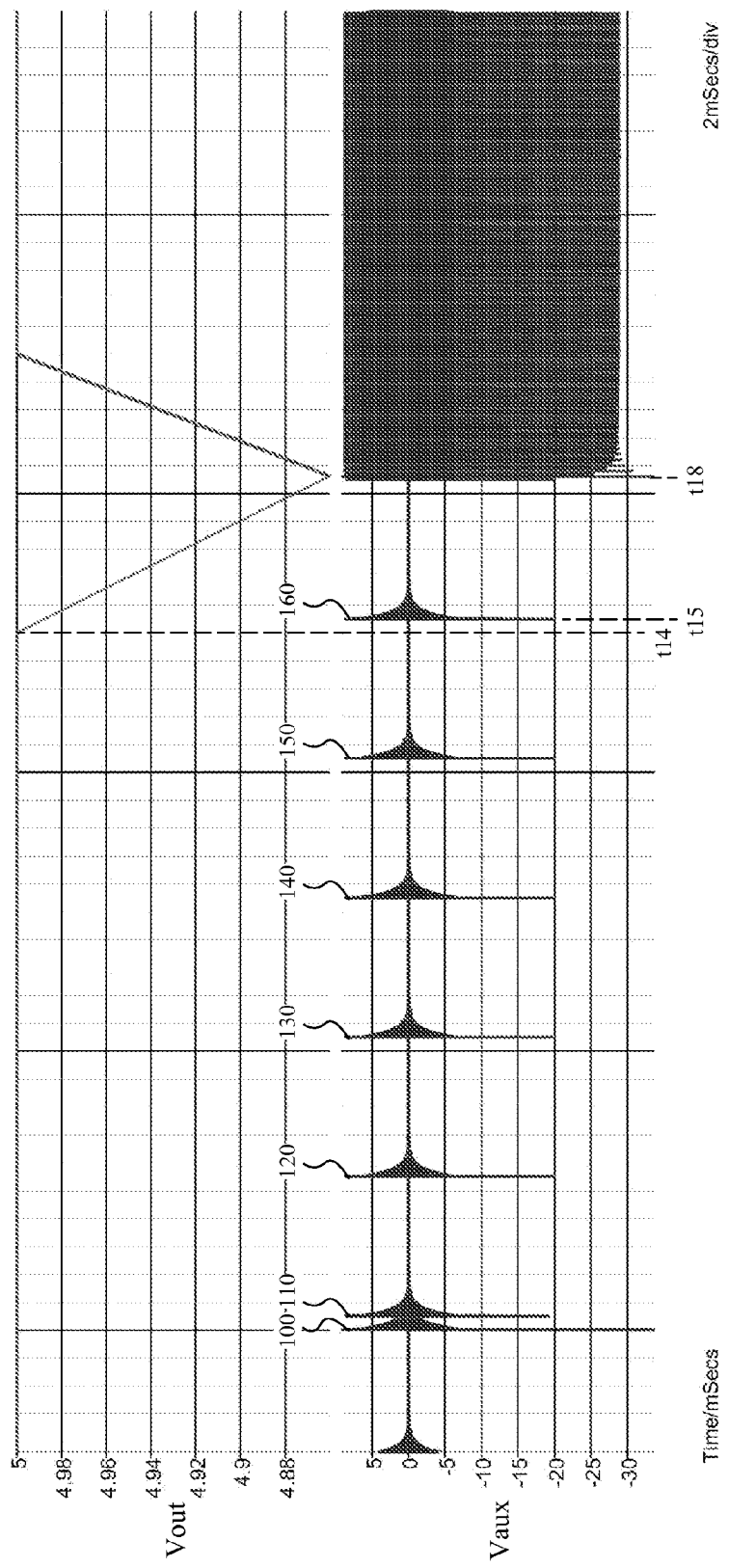
FIG. 3E illustrates a continuation of the pulse scheme shown in FIG. 3A according to an embodiment.
Figure 3F:
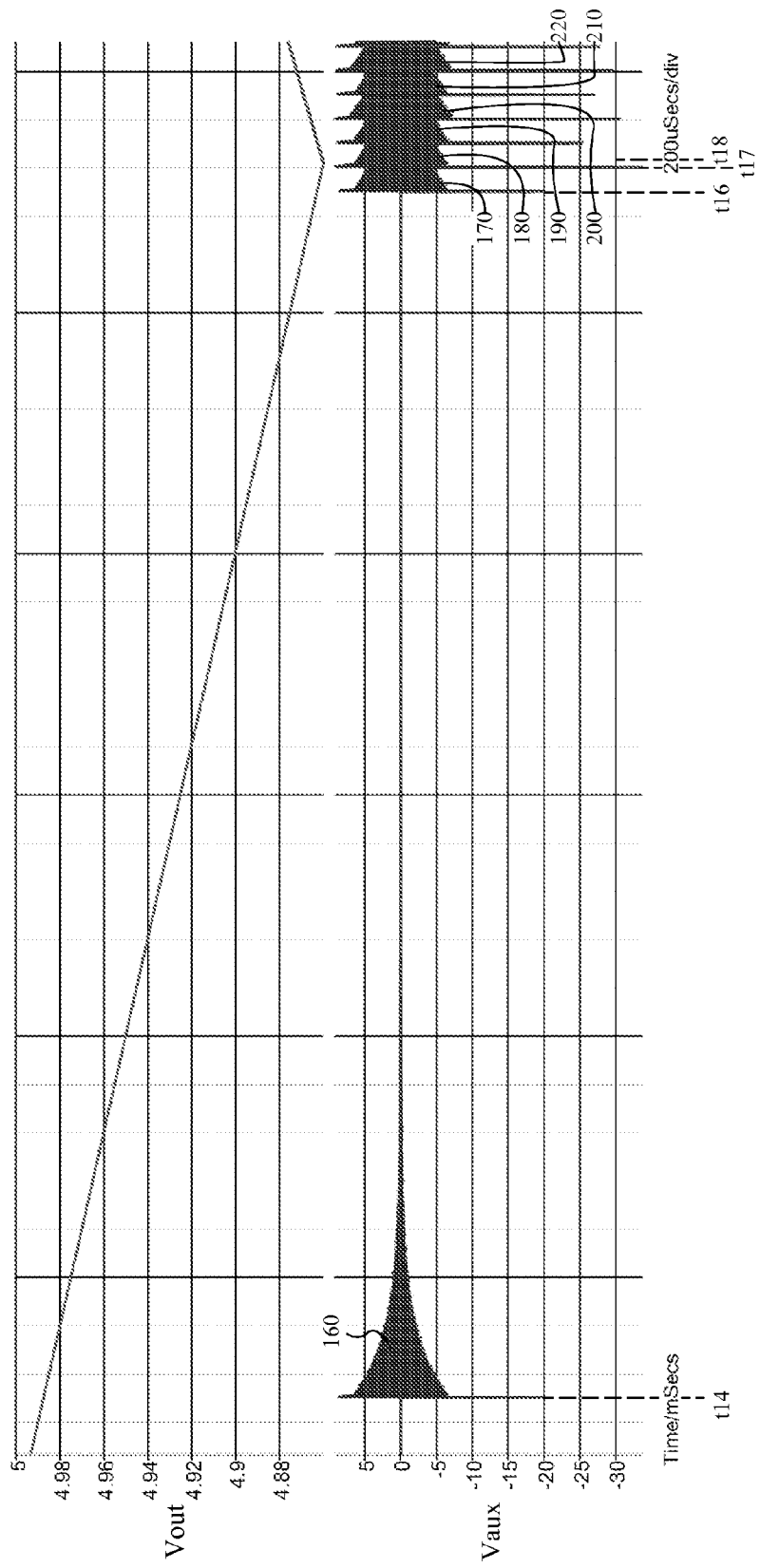
FIG. 3F illustrates an expanded view of a portion of the waveforms shown in FIG. 3E.

While the no-load condition remains unchanged, additional detection pulses are generated, each separated by an off-time, until a change in the output voltage Vout, and therefore a change in the no-load condition, is determined. FIG. 3E illustrates a continuation of the pulse scheme shown in FIG. 3A according to an embodiment. In addition to the auxiliary voltage Vaux, FIG. 3E also includes an exemplary waveform corresponding to the output voltage Vout. FIG. 3F illustrates an expanded view of a portion of the waveforms shown in FIG. 3E. Successive detection pulses 130, 140 and 150 are generated on a periodic basis, each corresponding to a constant output voltage Vout. In this exemplary case, the output voltage Vout remains at a constant 5V. The constant output voltage Vout represents no change in the no-load condition at the output. In this exemplary case, the no-load condition remains until time t14 corresponding to approximately 25 msec. Until time t14, the peak voltage is the same for each detection pulse 120, 130, 140 and 150. From time t14 to time t18, where time t18 corresponds to approximately time 26.12 msec, the output voltage Vout drops from 5V to 4.87V.

At time t15 corresponding to approximately time 25.1 msec, a regularly scheduled detection pulse 160 is generated. Since the detection pulse 160 is generated so close to the onset of the output voltage Vout drop, the peak voltage corresponding to the detection pulse 160 only differs slightly from the peak voltage corresponding to the reference pulse 110. In some embodiments, the comparison between peak voltages of the reference pulse and a given detection pulse provides for slight variations, such as due to random noise and other circuit anomalies. In this case, a threshold is established whereby the difference between peak voltages must exceed the threshold for a change in output voltage to be acknowledged. As applied to the detection pulse 160, the difference between the peak voltage of detection pulse 160 and the peak voltage of reference pulse 110 does not exceed the established threshold. Therefore, the controller 22 does not react to the voltage drop.

At time t16 (FIG. 3F) corresponding to approximately time 26.1 msec, a next regularly scheduled detection pulse 170 is generated. By the time the detection pulse 170 is generated, the output voltage Vout has dropped by an amount that the difference between the peak voltage corresponding to the detection pulse 170 and the peak voltage corresponding to the reference pulse 110 exceeds the threshold value. As such, the controller 22 determines that there is a change in the no-load condition at the output. In response to this determination, a measurement pulse 180 is generated at the time t17 corresponding to approximately time 26.12 msec.

As described above, a measurement pulse enables enough energy to be transferred to the secondary side such that the output voltage Vout can be measured accurately via measurement of the auxiliary voltage Vaux. In response to the measurement pulse 180, the output voltage Vout is determined to be lower than the desired 5V. As such, the controller 22 increases the output power to increase the output voltage Vout. At this point, the controller 22 is in normal load mode until no-load is again detected. In some embodiments, the system enters normal load mode after the measurement pulse 180. In other embodiments, the system enters normal load mode after the detection pulse 170 and before the measurement pulse 180. In normal load mode, successive measurement pulses are generated to detect a no-load condition, similar to the measurement pulse 100 in FIG. 3A. The measurement pulses are generated at a higher frequency than the detection pulses, such as measurement pulses 190, 200, 210 and 220 shown in FIG. 3F. The measurement pulses 190, 200, 210 and 220 in normal load mode are at least as large as the measurement pulse 100.

In operation, a measurement pulse is generated to determine if a load or no-load condition exists at the output. The measurement pulse provides enough energy transfer to the secondary side to enable determination of an exact output voltage according to a measured reflected voltage, such as the auxiliary voltage. If it is determined that a load condition exists, then the system continues to operate in normal load mode and another measurement pulse is generated according to a scheduled period. If instead it is determined that a no-load condition exists, then the system enters into a no-load mode of operation. When in no-load mode, it is necessary to determine when a load is coupled to the output so that the system can convert back to normal load mode of operation. After the measurement pulse that determined the no-load condition, a reference pulse is generated. The reference pulse is used to determined a baseline auxiliary voltage value, such as a peak voltage. The reference pulse results in less energy transfer than the measurement pulse. The energy transferred due to the reference pulse is insufficient to enable exact calculation of the output voltage. However, the relative changes in the peak voltage can be determined. Change in the peak voltage indicates a change in the no-load condition. To determine changes in the peak voltage, detection pulses are periodically generated after the baseline peak voltage is determined using the reference pulse. The peak voltage for the detection pulse is compared to the peak voltage for the reference pulse. If the peak voltage for the detection pulse is different, or exceeds some threshold difference, than the peak voltage for the reference pulse, then it is determined that the no-load condition has changed and a measurement pulse is generated to determine the exact output voltage. If the output voltage has dropped below a certain value, then the system converts to normal load mode and increases output power. If instead the peak voltage for the detection pulse is the same, or within some threshold difference, than the peak voltage for the reference pulse, then it is determined that the no-load condition remains. The system remains in the no-load mode of operation and another detection pulse is periodically generated.

Figure 4:
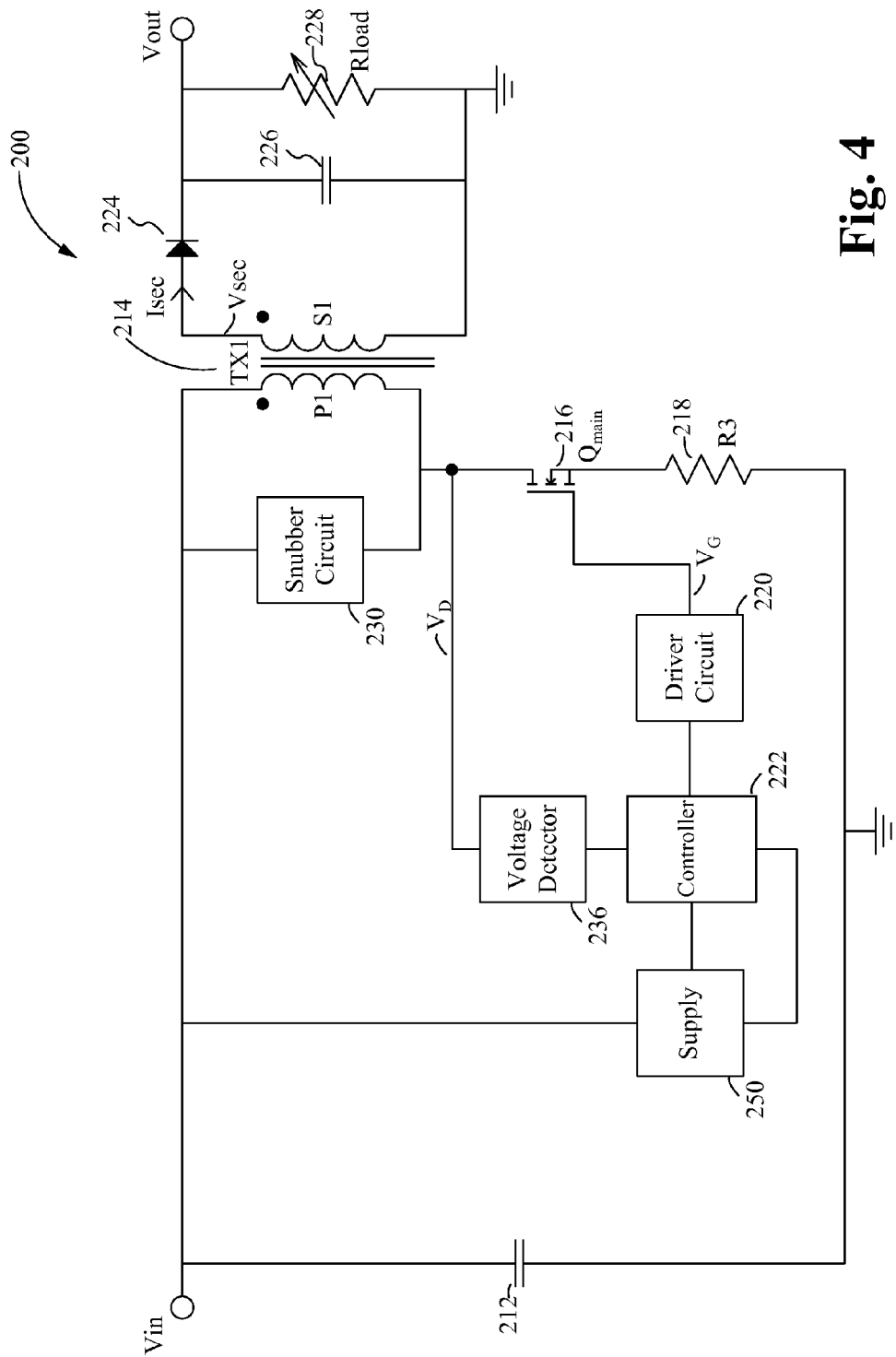
FIG. 4 illustrates a power converter circuit according to another embodiment.

The power converter 10 of FIG. 1 is configured to measure and compare the auxiliary winding voltage Vaux for the purposes of determining a change in the no-load condition at the output. In general, a change in the no-load condition can be determined by monitoring a reflected voltage on the primary side of the circuit. As such, the power converter can be alternatively configured without the auxiliary winding, where the primary winding is instead measured and compared for the purposes of determining a change in the no-load condition at the output. FIG. 4 illustrates a power converter 200 according to another embodiment. The power converter 200 includes a capacitor 212, a transformer 214, a main switch 216, a resistor 218, a driver circuit 220, a controller 222, a diode 224, a capacitor 226, a load 228, a snubber circuit 230, a voltage detector circuit 236 and a power supply circuit 250. The power converter 200 is configured and operates similarly to the power converter 10 of FIG. 1 except the power converter 200 does not include an auxiliary winding. Instead, the voltage detector circuit 236 measures a voltage Vd across the primary winding P1 and transmits the measured voltage Vd to the controller 222. In the exemplary configuration of FIG. 4, the power supply circuit 250 is coupled to the input voltage Vin. The power converter 200 functions similarly as the power converter 10 in FIG. 1 to determine a change in the no-load condition at the output.

In some embodiments, the supply voltage for the controller is derived from a winding of the transformer. In this case, the current consumption of the controller can have a big influence on the reflected voltage that is measured and compared for determining a change in the no-load condition. To minimize this influence, the winding can be disconnected from the supply of the controller while the reflected voltage is sampled. The winding must be connected to the supply of the controller for some time to provide enough energy for the controller. Therefore, a switch can be implemented between the winding and the supply of the controller. In the case of the above described pulse scheme, this switch preferably disconnects the winding from the supply of the controller during measurement of the reflected voltage for the reference pulses and detection pulses. For measurement pulses, during an initial portion of measurement pulses the winding is connected to the supply of the controller to be able to provide energy to the controller. During a later portion, the winding is disconnected to enable precise measurement.

In some embodiments, another pulse may be implemented before the measurement pulse is applied, where this other pulse results in energy transfer to the controller but is not measured. A size of this other pulse is similar to a measurement pulse, or probably bigger. In a timing diagram similar to FIG. 3E, these two pulses can appear similar to two measurement pulses in sequence with a short off-time in between.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling a switching mode power converter, the method comprising:

a. configuring the switching mode power converter comprising a transformer having a primary winding coupled to an input supply voltage and a secondary winding coupled to an output, a switch coupled in series to the primary winding, and a controller coupled to the switch;
b. generating one or more measurement pulses by selectively turning ON and OFF the switch and measuring a reflected voltage corresponding to each of the one or more measurement pulses until a no-load condition at the output is determined, wherein the measured reflected voltage is proportional to an output voltage of the switching mode power converter;
c. after the no-load condition is determined, generating a reference pulse by selectively turning ON and OFF the switch and measuring a reflected voltage corresponding to the reference pulse, wherein the measured reflected voltage corresponding to the reference pulse comprises a baseline reflected voltage;
d. generating one or more detection pulses by selectively turning ON and OFF the switch and measuring a reflected voltage corresponding to each of the one or more detection pulses;
e. comparing the reflected voltage corresponding to each of the one or more detection pulses to the baseline reflected voltage until a difference between the baseline reflected voltage and the reflected voltage corresponding to one of the one or more detection pulses exceeds a threshold value whereupon a change in the no-load condition is determined.

2. The method of claim 1 wherein generating each measurement pulse results in sufficient energy transfer to a secondary side of the switching mode power converter so as to accurately determine the output voltage according to the measured reflected voltage.

3. The method of claim 1 wherein there is an off time between generating the reference pulse and generating a first detection pulse during which the reflected voltage settles to almost zero.

4. The method of claim 1 wherein there is an off time between generating successive detection pulses during which the reflected voltage settles to almost zero.

5. The method of claim 1 wherein when the no-load condition is determined, the switching mode power converter is set to a no-load mode of operation.

6. The method of claim 1 wherein when the change in the no-load condition is determined, the switching mode power converter is set to a normal load mode of operation.

7. The method of claim 1 wherein when the change in the no-load condition is determined, the method further comprises generating another measurement pulse, measuring the reflected voltage corresponding to the other measurement pulse and determining if there is a load condition or the no-load condition at the output according to the measured reflected voltage corresponding to the other measurement pulse.

8. The method of claim 1 wherein the reflected voltage comprises a voltage across the primary winding.

9. The method of claim 1 wherein the switching mode power converter further comprises an auxiliary winding electrically coupled to the controller and magnetically coupled to the secondary winding, wherein the reflected voltage comprises a voltage across the auxiliary winding.

10. The method of claim 2 wherein generating the reference pulse results in energy transfer to the secondary side of the switching mode power converter, wherein an energy transfer corresponding to the reference pulse is less than an energy transfer corresponding to the measurement pulse.

11. The method of claim 10 wherein the energy transfer corresponding to the reference pulse is insufficient to accurately determine the output voltage according to the measured reflected voltage.

12. A method of controlling a switching mode power converter, the method comprising:
a. configuring the switching mode power converter comprising a transformer having a primary winding coupled to an input supply voltage and a secondary winding coupled to an output, a switch coupled in series to the primary winding, and a controller coupled to the switch;
b. generating a measurement pulse by selectively turning ON and OFF the switch and measuring a reflected voltage corresponding to the measurement pulse, wherein the measured reflected voltage corresponding to the measurement pulse is proportional to an output voltage of the switching mode power converter;
c. determining a load condition or a no-load condition at the output according to the measured reflected voltage corresponding to the measurement pulse;
d. if the load condition is determined, then periodically generating additional measurement pulses until the no-load condition is determined;
e. if the no-load condition is determined, then:
  i. generating a reference pulse by selectively turning ON and OFF the switch and measuring a reflected voltage corresponding to the reference pulse, wherein the measured reflected voltage corresponding to the reference pulse comprises a baseline reflected voltage;
  ii. generating a detection pulse by selectively turning ON and OFF the switch and measuring a reflected voltage corresponding to the detection pulse;
  iii. comparing the reflected voltage corresponding to the detection pulse to the baseline reflected voltage, and if a difference between the reflected voltage corresponding to the detection pulse and the baseline reflected voltage is less than a threshold value, then it is determined that the no-load condition remains and a subsequent detection pulse is generated and compared, and if the difference is greater than or equal to the threshold value, then it is determined that there is a change in the no-load condition.

13. The method of claim 12 wherein generating the measurement pulse results in sufficient energy transfer to a secondary side of the switching mode power converter so as to accurately determine the output voltage according to the measured reflected voltage.

14. The method of claim 12 wherein there is an off time between generating the reflected pulse and generating the detection pulse during which the reflected voltage settles to almost zero.

15. The method of claim 12 wherein there is an off time between generating successive detection pulses during which the reflected voltage settles to almost zero.

16. The method of claim 12 wherein if the no-load condition is determined, the switching mode power converter is set to a no-load mode of operation.

17. The method of claim 12 wherein if the load condition is determined, then the switching mode power converter is set to a normal load mode of operation.

18. The method of claim 12 wherein if the change in the no-load condition is determined, then the switching mode power converter is set to a normal load mode of operation.

19. The method of claim 12 wherein if the change in the no-load condition is determined, then the method further comprises generating another measurement pulse, measuring the reflected voltage corresponding to the other measurement pulse and determining if there is the load condition or the no-load condition at the output according to the measured reflected voltage corresponding to the other measurement pulse.

20. The method of claim 12 wherein the reflected voltage comprises a voltage across the primary winding.

21. The method of claim 12 wherein the switching mode power converter further comprises an auxiliary winding electrically coupled to the controller and magnetically coupled to the secondary winding, wherein the reflected voltage comprises a voltage across the auxiliary winding.

22. The method of claim 13 wherein generating the reference pulse results in energy transfer to the secondary side of the switching mode power converter, wherein the energy transfer corresponding to the reference pulse is less than the energy transfer corresponding to the measurement pulse.

23. The method of claim 22 wherein the energy transfer corresponding to the reference pulse is insufficient to accurately determine the output voltage according to the measured reflected voltage.

24. A switching mode power converter comprising:
 a. a transformer having a primary winding coupled to an input supply voltage and a secondary winding coupled to an output;
 b. a switch coupled in series to the primary winding; and
 c. a controller coupled to the switch, wherein the controller is configured to turn the switch ON and OFF, wherein the controller is configured to generate one or more measurement pulses by selectively turning ON and OFF the switch and measuring a reflected voltage corresponding to each of the one or more measurement pulses until a no-load condition at the output is determined, wherein the measured reflected voltage is proportional to an output voltage of the switching mode power converter, and after the no-load condition is determined, generate a reference pulse by selectively turning ON and OFF the switch and measuring a reflected voltage corresponding to the reference pulse, wherein the measured reflected voltage corresponding to the reference pulse comprises a baseline reflected voltage, and generate one or more detection pulses by selectively turning ON and OFF the switch and measuring a reflected voltage corresponding to each of the one or more detection pulses, and compare the reflected voltage corresponding to each of the one or more detection pulses to the baseline reflected voltage until a difference between the baseline reflected voltage and the reflected voltage corresponding to one of the one or more detection pulses exceeds a threshold value whereupon a change in the no-load condition is determined.

\* \* \* \* \*